W. HOOPES.
COMPOSITE CONDUCTOR CABLE AND METHOD OF MAKING THE SAME.
APPLICATION FILED OCT. 10, 1914.
1,173,190.
Patented Feb. 29, 1916.
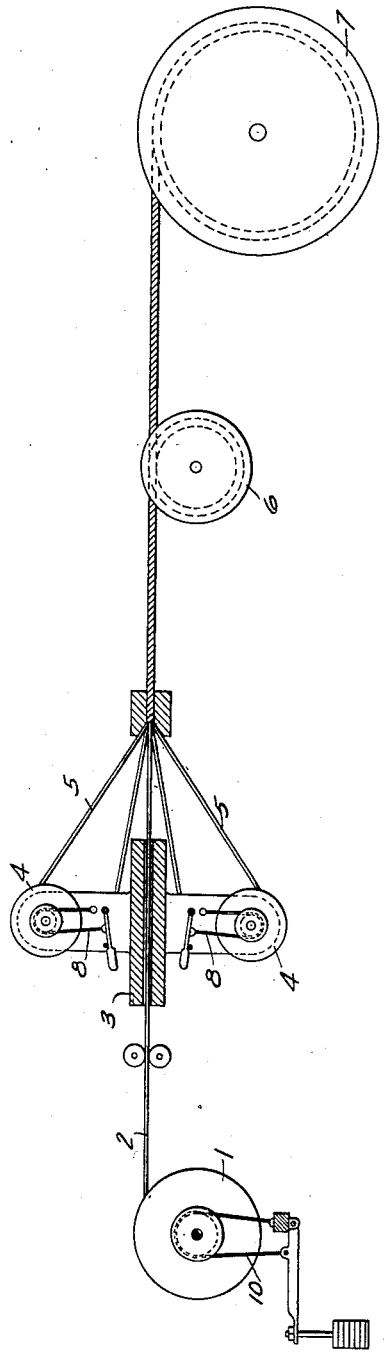
WITNESSES
INVENTOR
William Hoopes
By Fredk. H. Winter
his attorney

UNITED STATES PATENT OFFICE.

WILLIAM HOOPES, OF PITTSBURGH, PENNSYLVANIA, ASSIGNOR TO ALUMINUM COMPANY OF AMERICA, OF PITTSBURGH, PENNSYLVANIA, A CORPORATION OF PENNSYLVANIA.

COMPOSITE CONDUCTOR-CABLE AND METHOD OF MAKING THE SAME.

1,173,190.     Specification of Letters Patent.     Patented Feb. 29, 1916.

Application filed October 10, 1914. Serial No. 866,098.

*To all whom it may concern:*

Be it known that I, WILLIAM HOOPES, a resident of Pittsburgh, in the county of Allegheny and State of Pennsylvania, have invented a new and useful Improvement in Composite Conductor-Cables and Methods of Making the Same, of which the following is a specification.

This invention relates to composite conductor cables and the method of making the same.

The object of the invention is to provide a conductor cable formed of two or more metals in which the stresses and strains encountered in use are distributed more nearly in proper proportions between the different metals whereby each takes more nearly its own share of the load and all parts of the cable reach the elastic limit at more nearly the same time; which enables the cable to effectively withstand stresses and strains up to the elastic limit of all of the different metals used therein without becoming permanently distorted.

The invention comprises a composite conductor cable and the method of making the same as hereinafter more fully described and claimed.

In the drawings, the view represents a diagrammatic illustration of suitable apparatus for carrying out the method.

Electrical conductor cables are frequently made of different kinds of metal, such as combinations of aluminum and steel, copper and steel, aluminum and copper, or other combinations of metal. One common form of cable is made of a steel core surrounded by a suitable number, say six, spiral aluminum strands, the core and surrounding strands being each formed of one or a plurality of wires. Such cables in use are hung on upright supports and assume a catenary form between supports. They are subjected to various longitudinal stresses, due to the weight of the cable and to sleet and wind loads which produce effects identical with an increase in the weight of the cable. The maximum stress is usually produced by a combination of sleet sticking to the cables accompanied by a wind occurring at the same time, and also a low temperature tending to shorten the cable and thereby reduce its deflection and increase the mechanical stress, which for a given loading of the cable is practically inversely proportional to the deflection.

In most cable making machines the strands to form the outer envelop are wound around a core as the latter progresses through a machine carrying spools on which the strands are wound. The core passing through the machine is under no tension but merely passes through a hollow sleeve or shaft carrying the strand spools, which revolve around the core for winding the strands thereon. The strand spools are usually provided with a friction brake for imposing slight tension on the strands for taking up slack and winding them tightly about the core, but no tension is placed on the core.

If the cable is made up of a core of one metal and strands of another the strands and core are capable of being extended within their elastic limits by different amounts, depending upon the metals of which they are made. For example, in a cable formed of a steel core having an elastic limit of 130,000 lbs. per square inch and aluminum strands having an elastic limit of 14,000 lbs. per square inch, the core is capable of an extension within its elastic limit of .00447 of its length, while the aluminum used for the strands of the envelop around the core is capable of extension within its elastic limit of .00156 of its length. If such a cable is subjected to a load which will produce an increase of .00156 of its length the aluminum envelop will then be under tension up to its elastic limit, but the steel core will be under a tension considerably less than its elastic limit. If load is still further applied to the cable so that the total extension of the steel reaches .00447 of its length the steel will be under tension up to its elastic limit, but the aluminum will then have been permanently extended by the difference between .00447 and .00156, or .00291 of its length. After this permanent extension of the aluminum has taken place, the cable will not repeat the same motion with temperature variations that it had before the aluminum was permanently extended, since upon disappearance of the ice and wind the first contraction of .00156 of the length of the cable will entirely remove the tension from the aluminum, leaving it all on the steel. Originally, the steel and aluminum were jointly supporting the load due to the weight of the cable, sleet and ice, and tension due to low temperatures. Consequently, the deflection of the cable at a given temperature is greater after the application of a load producing stresses equal to the elastic limits of the two materials than it was prior to the application of such load.

According to my invention the cable is formed by subjecting one or all of the strands to form the envelop and core to an initial tensile stress dependent upon the character of the metal of which they are made. By imposing a tensile stress upon the core before it enters the cable-forming machine, it is possible to control the relative tensions in the core and strands of the envelop, so that the tension on the strands may be either higher or lower than the tension on the core. After the finished cable leaves the pulling drum, nearly all of the tension on both the strands and core is removed, since the reel on which the cable is wound after leaving the pulling drum is driven by a force only sufficient to take up slack in the cable. If the tension on the steel core is made higher than the tension on the aluminum strands being wound around it, the steel core is temporarily extended, and upon leaving the pulling drum the tension disappears and the steel core contracts, thereby producing compression in the aluminum strands of the envelop and causing them to spring apart slightly, so that the effect is that the unstressed length of the steel core is shorter than the length of the surrounding strands. When such a cable is put into service the weight of the cable and its external load, if any, produces a tensile stress therein, but the aluminum strands of the envelop receive no tensile stress until after the core has been extended by the same amount as it contracted on leaving the take-up drum. The strands of the envelop do not therefore begin to extend until after the cable is carrying a certain predetermined load, and when they do begin to extend the strands of the envelop and the steel core both reach their elastic limits at the same time.

The method may be carried out on any suitable machine or apparatus capable of imposing the requisite amount of initial tensile stress upon the strands of the envelop and the wire for forming the core. A suitable form of apparatus is shown in the drawings, where—

1 represents a reel for carrying the wire to form the core 2, which core passes through sleeve 3, carrying the spools 4 for holding the strands 5 to be wound around the core, said sleeve and the spools carried thereby being rotatable around the core for laying the strands of the envelop in the ordinary manner. Two or three turns of the formed cable pass around a pulling or take-up drum 6 from which the cable is led to the shipping reel 7, on which it is wound. The spools 4 are each provided with an adjustable brake 8, for regulating the tension of the strands being wound about the core. The reel 1 for carrying the wire for forming the core is also provided with suitable adjustable braking means, indicated at 10, whereby friction may be imposed upon the reel to retard its rotation and produce any desired amount of tension upon the core, or the brake may be applied directly to the core just before it enters the sleeve 3. If the core is formed of a comparatively strong material, such as steel, and the strands are formed of a weaker material, such as aluminum, the friction brake 10 is adjusted so as to impose a higher degree of tension upon the core before it enters the cable-laying machine than is imposed upon the strands 5 to form the envelop.

The difference in tension between the strands and core is regulated according to the materials of which the core and envelop are formed, varying for different metals, such as aluminum, copper, steel, or the like, but in any case will be such that when the completed cable is put into service the weaker metal will not begin to extend until after the stronger metal has been subjected to a tensile stress equivalent to the difference of tensions imposed upon the same in the cable-laying machine, so that all portions of the cable are extended in such manner as to reach their elastic limits at more nearly the same time than they otherwise would. Inasmuch as the coefficients of expansion of different metals, such as aluminum and steel, are different, a fall of temperature below the temperature at which the cable was constructed will also tend to make one material, such as the aluminum, take more than its share of the load, and reach its elastic limit more quickly than desired. Correction for this error can also be made by still further increasing the initial tensile stress on the steel core during manufacture. In practice, however, no such correction is necessary because the cable winding machine does not lay the strands of the envelop closely and usually a fall of temperature such as is ordinarily encountered in service is necessary before the aluminum strands are shortened sufficiently to bring them into actual contact with the core, a condition which is necessary before the strands of the envelop begin to take much load.

The method described enables a composite cable to be manufactured so that its deflection under ordinary conditions is a definite quantity and can be depended upon under normal conditions of service, thereby avoiding a large factor of safety and the construction of unnecessarily high supports for the cable with corresponding increase in cost of installation. It also avoids the necessity of periodically shortening the cable between supports to take up the slack and leave the proper clearance above the ground, thereby at the same time preventing liability of interruption of service to make repairs.

What I claim is:—

1. A composite cable, comprising a core and envelop formed of different metals, one thereof being under a greater initial tensile stress than the other.

2. A composite cable, comprising a core and an envelop composed of different metals, the core being under an initial tensile stress greater than the stress in the envelop.

3. A composite cable, comprising a steel core and an envelop of weaker metal, the steel core being under an initial tensile stress greater than that in the envelop.

4. A composite cable, comprising a steel core and an aluminum envelop, the steel core being under an initial tensile stress greater than that in the envelop.

5. The method of making cables, consisting in winding strands around a core to form an envelop therefor, and subjecting one thereof to a greater initial tensile stress than the other during the winding of the cable.

6. The method of making cables, consisting in winding strands around a core to form an envelop therefor, and imposing different tensile stresses upon the core and envelop while winding the same.

7. The method of making composite cables, consisting in winding strands of one metal around a core of another metal to form an envelop therefor, and placing different tensile stresses in the core and strands during the winding thereof.

8. The method of making composite cables, consisting in winding strands of a soft metal around a core of a harder metal to form an envelop therefor, and subjecting the core to a greater initial stress than the strands for forming the envelop.

9. The method of making composite cables, consisting in winding aluminum strands around a steel core to form an envelop therefor, and placing an initial tensile stress in the steel core while winding the aluminum strands thereon.

In testimony whereof, I have hereunto set my hand.

WILLIAM HOOPES.

Witnesses:
EMMA UHLINGER,
WILLIAM B. WHARTON.